(12) United States Patent
De Vos et al.

(10) Patent No.: US 9,986,746 B2
(45) Date of Patent: Jun. 5, 2018

(54) FILLETING DEVICE

(71) Applicant: Meyn Food Processing Technology B.V.

(72) Inventors: Ferdinand Allard De Vos, Oostzaan (NL); Pieter Willem Vonk, Oostzaan (NL); Michael George Lourentius Koopman, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days. days.

(21) Appl. No.: 15/652,674

(22) Filed: Jul. 18, 2017

(65) Prior Publication Data

US 2018/0027827 A1 Feb. 1, 2018

(30) Foreign Application Priority Data

Jul. 27, 2016 (NL) .................................... 2017244

(51) Int. Cl.
| A22C 17/02 | (2006.01) |
| A22C 21/00 | (2006.01) |
| B65G 17/16 | (2006.01) |
| B65G 17/24 | (2006.01) |
| B65G 21/20 | (2006.01) |

(52) U.S. Cl.
CPC ........ A22C 21/003 (2013.01); A22C 21/0069 (2013.01); B65G 17/16 (2013.01); B65G 17/24 (2013.01); B65G 21/20 (2013.01); B65G 2812/02069 (2013.01)

(58) Field of Classification Search
None
See application file for complete search history.

(56) References Cited

U.S. PATENT DOCUMENTS

| 4,651,385 A | * | 3/1987 | Persson ................... | A22C 25/08 198/367 |
| 5,125,868 A | * | 6/1992 | Persson ................... | A22C 25/12 452/179 |
| 5,267,890 A | * | 12/1993 | Koch ................... | A22C 21/0092 452/125 |
| 5,372,539 A | | 12/1994 | Kunig | |
| 7,204,748 B2 | * | 4/2007 | Gasbarro ............ | A22C 21/0023 452/149 |
| 7,637,805 B1 | * | 12/2009 | Bueide ................... | A22C 25/12 452/179 |

(Continued)

FOREIGN PATENT DOCUMENTS

| DE | 4105564 | 8/1992 |
| EP | 1731038 A1 | 12/2006 |
| EP | 2218333 A1 | 8/2010 |

OTHER PUBLICATIONS

PCT Search Report for 2017244 dated Mar. 10, 2017.

*Primary Examiner* — Richard T Price, Jr.
(74) *Attorney, Agent, or Firm* — Dority & Manning, P.A.

(57) ABSTRACT

A filleting device and method for harvesting fillets from a poultry carcass that is moved in a conveyor-line and supported on a carrier. Fillets may be guided to a pulling device that may be placed in or adjacent to the path of the poultry carcass. Harvesting of the fillets may be completed with the pulling device while keeping the fillets pushed against the first guide rail or rails and/or the pulling device. Harvested fillets may be moved to at least one outlet for the fillets.

12 Claims, 4 Drawing Sheets

(56) References Cited

U.S. PATENT DOCUMENTS

| | | | | |
|---|---|---|---|---|
| 8,231,444 B2* | 7/2012 | De Vos | ................ | A22C 21/003 |
| | | | | 452/136 |
| 8,690,646 B1* | 4/2014 | Kielian | ................ | A22C 25/17 |
| | | | | 452/125 |
| 8,974,271 B2* | 3/2015 | De Vos | ................ | A22C 21/003 |
| | | | | 452/136 |

* cited by examiner

FILLETING DEVICE

PRIORITY STATEMENT

The present application claims priority under 35 U.S.C. § 119 to Dutch Application No. 2017244, filed Jul. 27, 2016.

FIELD OF THE INVENTION

The subject matter of the present disclosure relates generally to a filleting device for harvesting fillets from a poultry carcass.

BACKGROUND OF THE INVENTION

A conventional device and method for harvesting fillets from a poultry carcass are known from EP-B-2 218 333.

SUMMARY OF THE INVENTION

In an effort to further improve the known method and device the invention has as an exemplary object to control the position and/or orientation of the fillets harvested from the carcass when coming out of the at least one outlet for the fillets.

It is a further exemplary object of the invention to control the positioning and/or orientation of the harvested poultry fillets, particularly when they are received on a subsequent band conveyor.

It is still a further exemplary object of the invention to save on labor costs and manpower that is required in the prior art for placing the harvested fillets in the desired position and/or orientation.

It is still a further exemplary object of the invention to make the position and/or orientation of the harvested fillets reproducible, which benefits their automatic further processing.

The invention therefore proposes a device and method in accordance with one or more of the appended claims.

In one exemplary aspect, the invention also relates to a method for harvesting fillets from a poultry carcass that is moved in a conveyer-line and supported on a carrier, including of guiding the fillets to a pulling device which is placed in or adjacent to the path of the poultry carcass, and completing with the pulling device the harvesting of the fillets while keeping the fillets pushed against the first guide rail or rails and/or the pulling device, and moving the harvested fillets to at least one outlet for the fillets.

Additional exemplary aspects of the invention relate generally to a filleting device for harvesting fillets from a poultry carcass that is moved in a conveyer-line and supported on a carrier, and includes a first guide rail or rails to guide the fillets to a pulling device that is placed in or adjacent to the path of the poultry carcass and that completes the harvesting of the fillets, and includes a rotor having flexible flaps or brushes extending therefrom that are arranged to support the fillets while the carcass is conveyed by its carrier to keep the fillets against the first guide rail or rails and/or the pulling device, and that following the pulling device there is a second guide rail for moving the harvested fillets to a discharge region with at least one outlet for the fillets.

In another exemplary aspect of the invention, a discharge region has two separate outlets for both fillets of the carcass. This makes a distinction and individual positioning and orientation possible of the fillets coming from the left part and from the right part of the carcass.

In another exemplary aspect, it is further advantageous that the two separate outlets for both fillets of the carcass are staggered with respect to each other. Even when the fillets coming from the left part or coming from the right part of the carcass are lying near to each other, it then still remains easily possible to distinguish between both streams of fillets coming from the left part or from the right part of a stream of carcasses.

In another exemplary aspect, in addition to or separate from the staggered outlets, it is also advantageous that the two separate outlets for both fillets of the carcass are shifted sideways with respect to the poultry fillets conveying direction, in order to provide two separate lines or streams of fillets and to avoid that the fillets from the left part and from the right part of the carcass will eventually be in line with each other after being discharged from the outlets of the discharge region.

Each outlet of the discharge region may be provided with a pulling device. This promotes that the respective fillets can easily be transferred to a subsequent processing device, such as the earlier mentioned band conveyor. Accordingly, in one exemplary aspect it is preferred that the pulling device of each outlet is arranged to guide the concerning fillet away from the rotor with the flexible flaps or brushes. It is for that purpose also beneficial that each pulling device of each outlet is embodied as a roller with circumferential grooves to make frictional contact with the flesh of the fillets easy.

As already mentioned, in an exemplary aspect it is preferred that in the conveying direction of the fillets, the discharge region is followed by a band conveyor. This band conveyor can be effectively used to further manipulate the position and/or orientation of the fillets on the conveyor by providing the band conveyor with a preselected conveying speed. The inventors have found that this influences the fillets position and/or orientation coming out of the outlets and received on the band conveyor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1A:
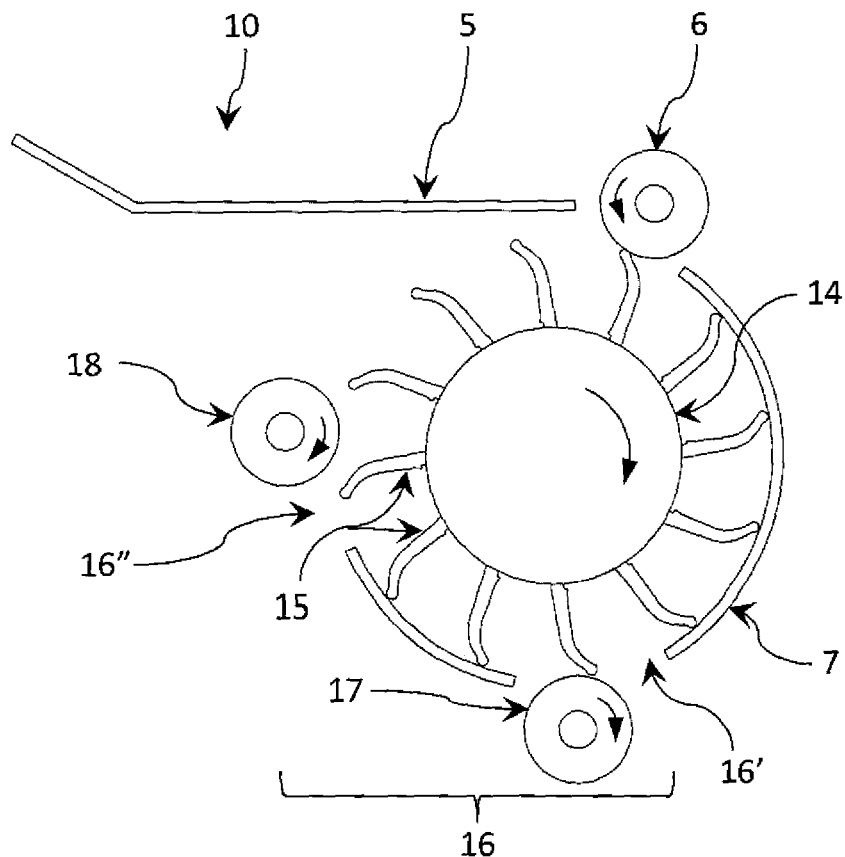
FIGS. 1A and 1B schematically show a filleting device according to exemplary aspects of the invention from the side and from the top without any carcass with fillets being present.
Figure 1B:
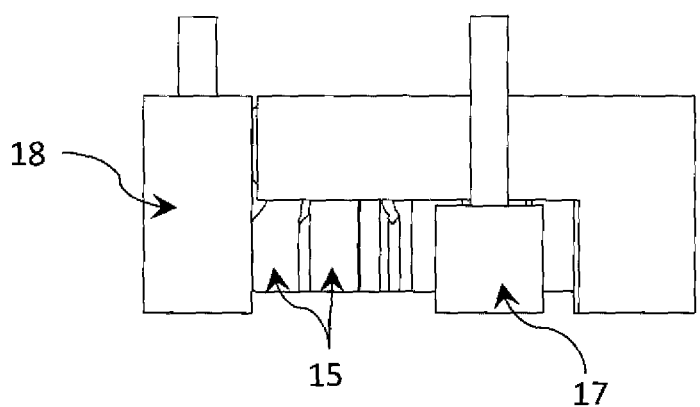
Figure 2A:
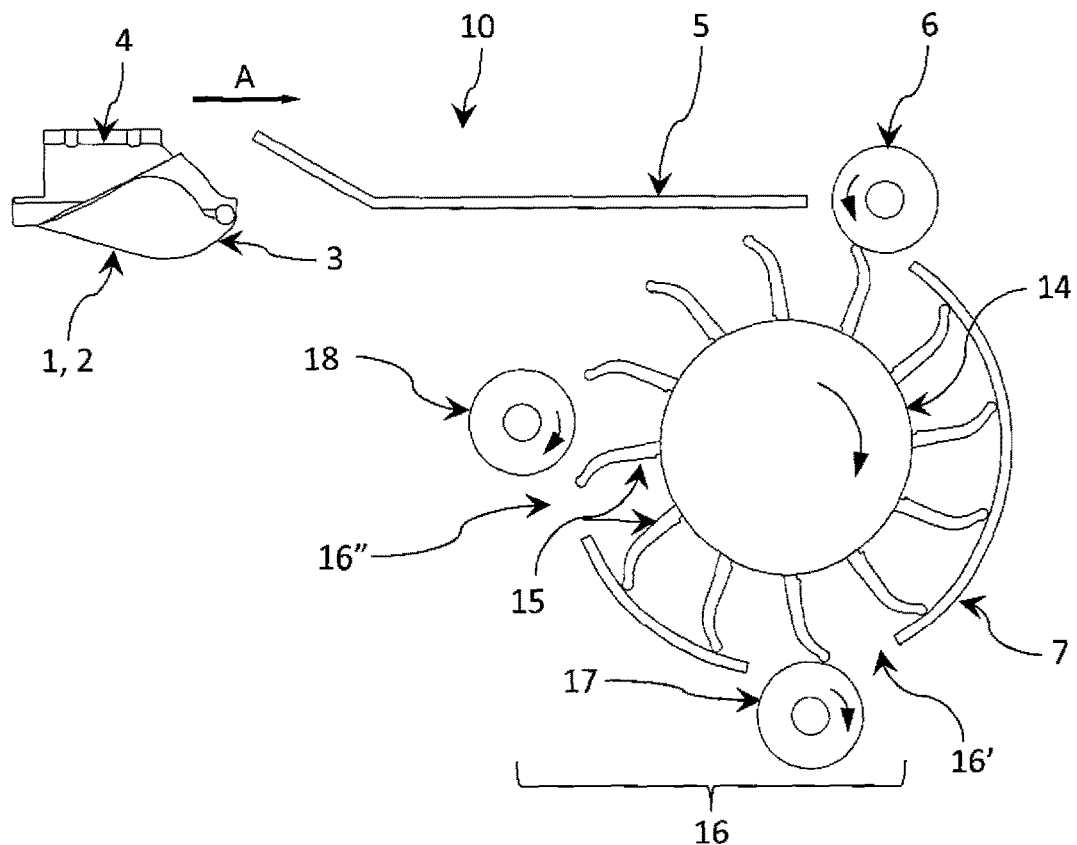
FIGS. 2A and 2B schematically show the exemplary filleting device of FIGS. 1A and 1B from the side and from the top with a carcass with fillets being present at its entry.
Figure 2B:
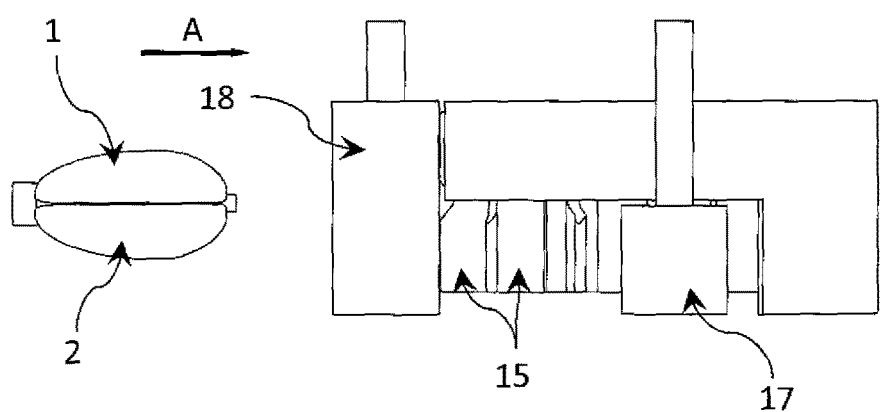

Starting with FIGS. 1A and 1B, such shows an exemplary filleting device 10 of the invention, yet without carcass provided with fillets. FIGS. 2A and 2B show that at its entry section a carrier 4 has arrived that moves in a conveying direction symbolized with arrow A. The carrier 4 forms in a known way part of a series of similar carriers that form part of a conveyor line for poultry carcasses 3 provided on such carriers 4. Also a in known way each poultry carcass 3 has fillets 1, 2 on the left part and on the right part of the carcass 3; see FIG. 2B.

Figure 3A:
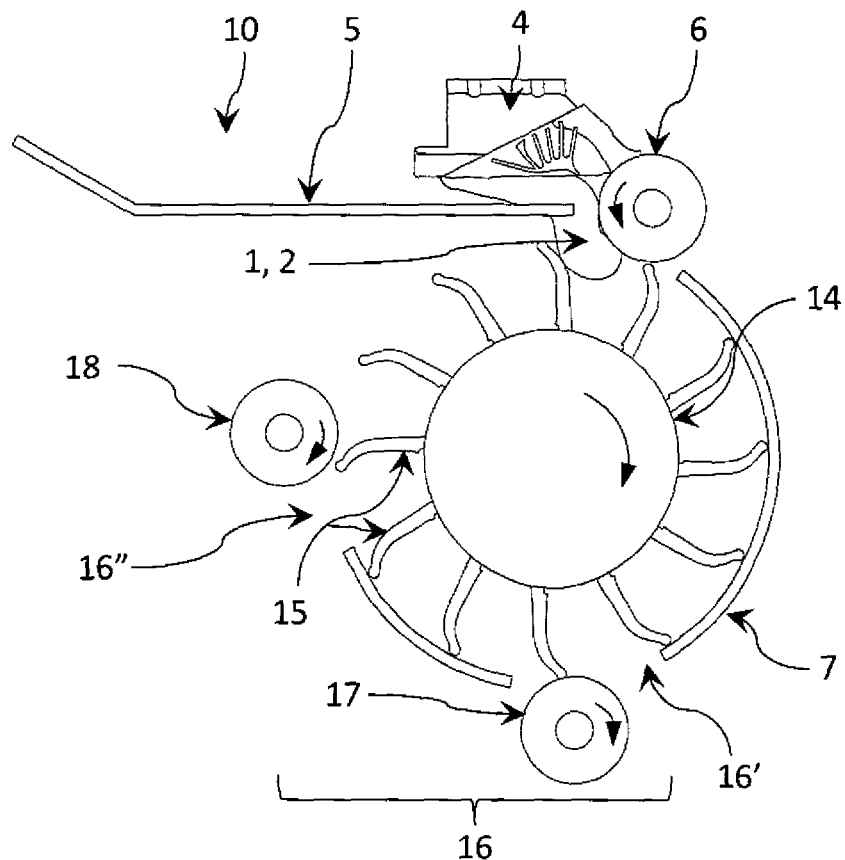
FIGS. 3A and 3B schematically show the filleting device of FIGS. 1A and 1B from the side and from the top with a carcass with fillets being present near the pulling device for harvesting the fillets.
Figure 3B:
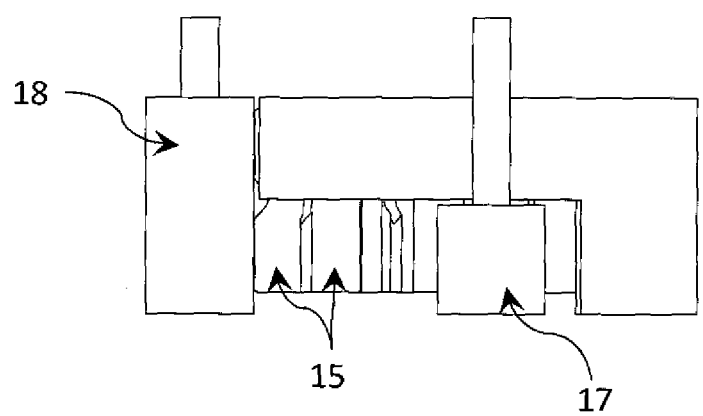

As mentioned the carrier 4 with the carcass 3 and its fillets 1, 2 moves in the direction A, wherein the fillets 1, 2 eventually contact a first guide rail or rails 5 to guide the fillets 1, 2 to a pulling device 6 which is placed in or adjacent to the path of the poultry carcass 3. FIGS. 3A and 3B show that the pulling device 6 completes the harvesting of the fillets 1, 2. In this process, depicted in FIGS. 2A and 2B and FIGS. 3A and 3B a rotor 14 having flexible flaps 15 or brushes extending therefrom, operate on the fillets to support the fillets 1, 2 while the carcass 3 is conveyed by its carrier 4 to keep the fillets 1, 2 pushed against the first guide rail or rails 5 and/or against the pulling device 6.

Figure 4A:
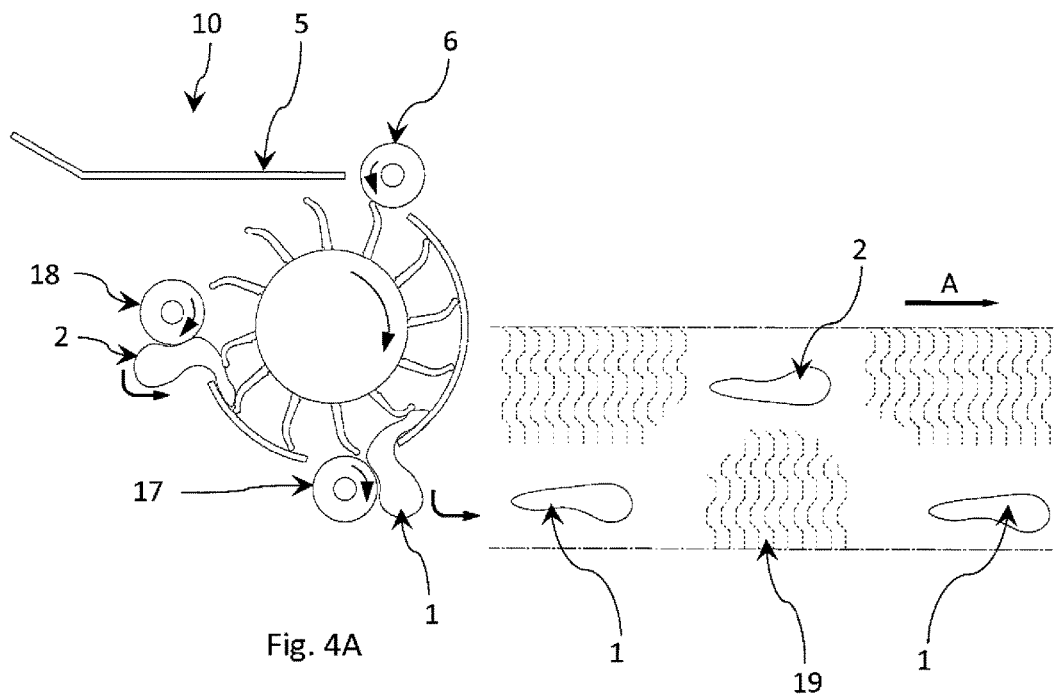
FIGS. 4A and 4B schematically show the filleting device of FIGS. 1A and 1B from the side and from the top showing the fillets being dropped to a subsequent band conveyor.
Figure 4B:
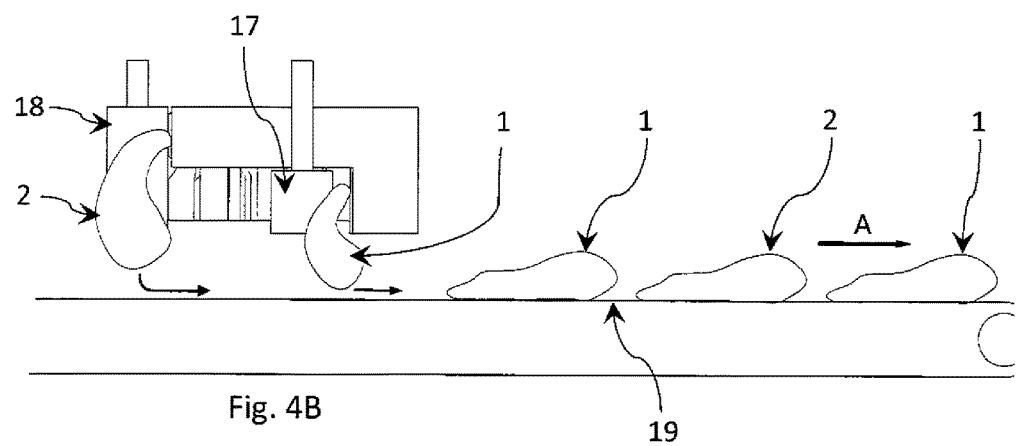

In FIGS. 4A and 4B the operation is shown of a second guide rail 7 that follows the pulling device 6. The second guide rail 7 ensures movement of the harvested fillets 1, 2 to a dis-charge region 16, which has two separate outlets 16', 16" for both fillets 1, 2 of the carcass 3.

It shows that the two separate outlets 16', 16" for both fillets 1, 2 of the carcass 3 are staggered with respect to each other. That is to say that fillet 1 leaves its outlet 16' earlier than fillet 2 leaves its outlet 16". Further the two separate outlets 16', 16" for both fillets 1, 2 of the carcass 3 can be seen to be adjacent although shifted sideways with respect to the fillets conveying direction so as to avoid that these outlets 16', 16", and the left and right fillets 1, 2 coming out therefrom, are in line with each other.

Particularly in FIGS. 4A and 4B it is shown that each outlet 16', 16" of the dis-charge region 16 is provided with a pulling device 17, 18. The pulling device 17, 18 of each outlet 16', 16" is arranged to guide the concerning fillet 1, 2 away from the rotor 14 with the flexible flaps 15 or brushes. Preferably, for this exemplary embodiment, each pulling device 17, 18 of each outlet 16', 16" is embodied as a roller with circumferential grooves. Although this is not shown in the figures, the way this can be implemented is clear for the skilled person and requires no further elucidation.

FIGS. 4A and 4B show further that in the conveying direction A of the fillets 1, 2, the discharge region 16 is followed by a band conveyor 19. Preferably the band conveyor 19 is provided with a preselected conveying speed for manipulating the fillets' 1, 2 orientation after coming out of their respective outlets 16', 16" and received on the band conveyor 19.

Although the invention has been discussed in the foregoing with reference to an exemplary embodiment of the filleting device of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A filleting device for harvesting fillets from a poultry carcass that is moved in a conveyer-line and supported on a carrier, comprising:
   a first guide rail or rails to guide the fillets to a pulling device that is placed in or adjacent to the path of the poultry carcass and that completes the harvesting of the fillets;
   a rotor having flexible flaps or brushes extending therefrom that are arranged to support the fillets while the carcass is conveyed by its carrier to keep the fillets against the first guide rail or rails, against the pulling device, or both; and
   a second guide rail following the pulling device, the second guide rail configured for moving the harvested fillets to a discharge region with at least one outlet for the fillets, wherein the discharge region has two separate outlets for both fillets of the carcass.

2. The filleting device according to claim 1, wherein the two separate outlets for both fillets of the carcass are staggered with respect to each other.

3. The filleting device according to claim 1, wherein the two separate outlets for both fillets of the carcass are shifted sideways with respect to the fillets conveying direction so as to avoid that they are in line with each other.

4. The filleting device according to claim 1, wherein each outlet of the discharge region is provided with a pulling device.

5. The filleting device according to claim 4, wherein each outlet of the pulling device of each outlet is arranged to guide the concerning fillet away from the rotor with the flexible flaps or brushes.

6. The filleting device according claims 4, wherein each pulling device of each outlet is embodied as a roller with circumferential grooves.

7. The filleting device according to claim 1, wherein along the conveying direction of the fillets, the discharge region is followed by a band conveyor.

8. The filleting device according to claim 7, wherein the band conveyor is provided with a preselected conveying speed for manipulating the fillets' orientation coming out of the outlets and received on the band conveyor.

9. A method for harvesting fillets from a poultry carcass that is moved in a conveyer-line and supported on a carrier, comprising:

guiding the fillets to a pulling device placed in or adjacent to the path of the poultry carcass;

completing with the pulling device the harvesting of the fillets while keeping the fillets pushed against the first guide rail or rails, against the pulling device or both; and moving the harvested fillets to at least one outlet for the fillets, wherein the fillets on the carcass are moved to two separate outlets for the fillets on the carcass, each outlet receiving a single fillet.

10. The method according to claim 9, further comprising providing the two separate outlets for the fillets at staggered positions with respect to each other.

11. The method according to claim 10, further comprising providing that the two separate outlets for the fillets on the carcass are shifted sideways with respect to the conveying direction of the fillets to avoid that they are in line with respect to each other.

12. The method according to any one of claims 10, further comprising moving the fillets coming out of the outlets to a band conveyor, and providing that the band conveyor has a preselected conveying speed.

\* \* \* \* \*